(12) United States Patent
Mignano

(10) Patent No.: US 11,783,249 B2
(45) Date of Patent: Oct. 10, 2023

(54) SYSTEM FOR CONTROLLING AND MANAGING A CHAIN OF ENERGY PRODUCTS AND RELATED PROCESS

(71) Applicants: SGM ENERGY S.R.L., Morcone (IT); Vincenzo Mignano, Morcone (IT)

(72) Inventor: Vincenzo Mignano, Morcone (IT)

(73) Assignees: Vincenzo Mignano, Morcone (IT); SGM ENERGY S.R.L., Morcone (IT)

( * ) Notice: Subject to any disclaimer, the term of this patent is extended or adjusted under 35 U.S.C. 154(b) by 0 days.

(21) Appl. No.: 17/264,428

(22) PCT Filed: Jul. 25, 2019

(86) PCT No.: PCT/IT2019/000059
§ 371 (c)(1),
(2) Date: Jan. 29, 2021

(87) PCT Pub. No.: WO2020/026278
PCT Pub. Date: Feb. 6, 2020

(65) Prior Publication Data
US 2021/0312364 A1 Oct. 7, 2021

(30) Foreign Application Priority Data
Aug. 2, 2018 (IT) .................. 102018000007756

(51) Int. Cl.
*G06Q 40/04* (2012.01)
*G06Q 50/04* (2012.01)
(Continued)

(52) U.S. Cl.
CPC ....... *G06Q 10/06313* (2013.01); *G06F 9/542* (2013.01); *G06F 16/25* (2019.01);
(Continued)

(58) Field of Classification Search
CPC ....... G06Q 10/06313; G06Q 10/06315; G06Q 40/123; G06Q 40/04; G06Q 30/018;
(Continued)

(56) References Cited

U.S. PATENT DOCUMENTS 8,160,952 B1 * 4/2012 Fell .................. G06Q 40/04
705/26.1
8,583,520 B1 * 11/2013 Forbes, Jr. ............ G06Q 40/00
700/286
(Continued)

FOREIGN PATENT DOCUMENTS

CN 101388092 A * 3/2009

OTHER PUBLICATIONS

Fera et al. "Production Scheduling Approaches for Operations Management" (2013) (https://www.intechopen.com/chapters/43001) (Year: 2013).*

*Primary Examiner* — Sujay Koneru
(74) *Attorney, Agent, or Firm* — Maschoff Brennan

(57) ABSTRACT

A system for controlling and managing a chain of energy products designed to computerize and digitalize a plurality of steps of the chain includes a database centralized and customized depending on implementation needs, required by a user, and designed to collect data related to the steps of the chain. A managing module is designed to perform an analysis of functional information implementing procedures aimed to computerize the chain of energy products. A plurality of operating areas is designed to be interfaced through communication interfaces with the database and with the managing module and to process functional information from data collected from the database and supply them to the managing module. An operating system controls
(Continued)

the operation of the database and of the managing module. A related process is used to computerize and digitalize a chain of energy products.

14 Claims, 1 Drawing Sheet

(51) Int. Cl.
    *G06Q 50/26*     (2012.01)
    *G06Q 50/28*     (2012.01)
    *G06F 16/25*     (2019.01)
    *G06F 9/54*     (2006.01)
    *G06Q 10/0631*     (2023.01)
    *G06Q 40/12*     (2023.01)
    *G06Q 30/018*     (2023.01)

(52) U.S. Cl.
    CPC ..... *G06Q 10/06315* (2013.01); *G06Q 30/018* (2013.01); *G06Q 40/04* (2013.01); *G06Q 40/123* (2013.12); *G06Q 50/04* (2013.01); *G06Q 50/26* (2013.01); *G06Q 50/28* (2013.01)

(58) Field of Classification Search
    CPC ........ G06Q 50/04; G06Q 50/26; G06Q 50/28; G06F 16/25; G06F 9/542
    See application file for complete search history.

(56) References Cited

U.S. PATENT DOCUMENTS

| | | | | |
|---|---|---|---|---|
| 8,666,791 B1* | 3/2014 | Fedele | .................. | G06Q 10/06 705/7.42 |
| 10,983,958 B1* | 4/2021 | Miller | .................... | H02J 3/381 |
| 2002/0049667 A1* | 4/2002 | Navani | .................. | G06Q 10/06 705/26.1 |
| 2002/0087234 A1* | 7/2002 | Lof | ........................ | G06Q 50/06 700/297 |
| 2003/0050807 A1* | 3/2003 | Hoffman | ................ | G06Q 10/06 705/7.31 |
| 2004/0064350 A1* | 4/2004 | Hanazato | ............ | G06Q 10/087 705/28 |
| 2008/0027769 A1* | 1/2008 | Eder | .................. | G06Q 10/0637 705/7.29 |
| 2008/0201180 A1* | 8/2008 | Green | .................... | G06Q 10/06 705/1.1 |
| 2009/0125350 A1* | 5/2009 | Lessing | .................. | G06Q 10/08 705/7.12 |
| 2010/0228583 A1* | 9/2010 | Banfield | ............ | G06Q 10/0639 705/7.38 |
| 2010/0332373 A1* | 12/2010 | Crabtree | ................ | G06Q 40/04 709/224 |
| 2011/0015802 A1* | 1/2011 | Imes | .................. | G05D 23/1923 700/300 |
| 2012/0296482 A1* | 11/2012 | Steven | .................... | G06Q 10/06 700/291 |
| 2014/0019288 A1* | 1/2014 | Bossinakis | ........ | G06Q 10/06315 705/26.4 |
| 2015/0012326 A1* | 1/2015 | Furman | ................ | G06Q 10/067 705/7.23 |
| 2015/0066442 A1* | 3/2015 | Pryor | ...................... | G06F 30/20 136/251 |
| 2015/0120224 A1* | 4/2015 | Siebel | ............... | G06F 16/24542 702/61 |
| 2015/0268282 A1* | 9/2015 | Ahmadi | .................. | G06Q 50/04 702/62 |
| 2017/0144878 A1* | 5/2017 | Koeninger | ............ | B67D 7/348 |
| 2017/0323265 A1* | 11/2017 | Burrows | ............... | G06F 16/438 |
| 2018/0046964 A1* | 2/2018 | Leoni | ............... | G06Q 10/06315 |
| 2020/0175630 A1* | 6/2020 | Bajaj | ..................... | G06Q 50/28 |

* cited by examiner

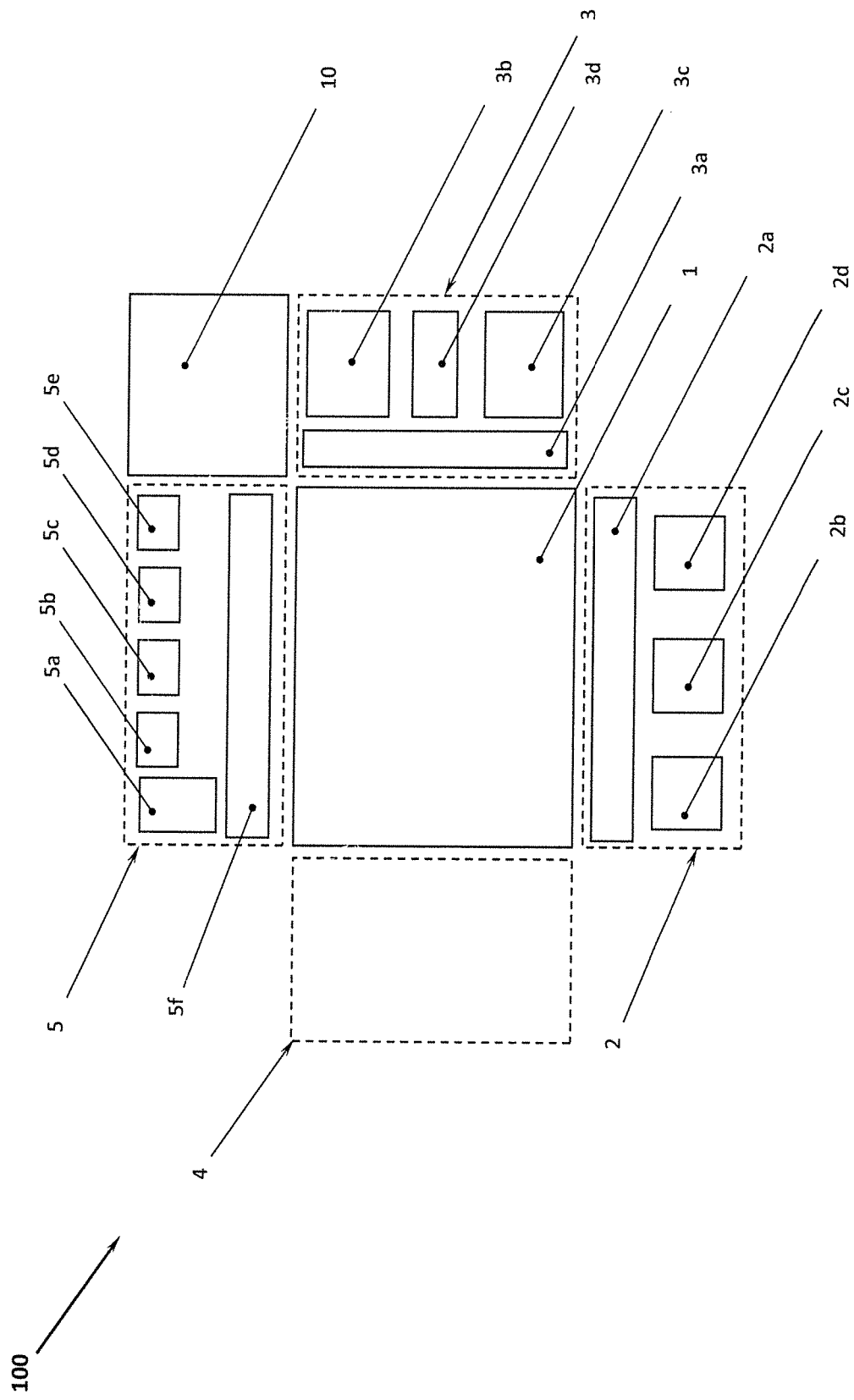

SYSTEM FOR CONTROLLING AND MANAGING A CHAIN OF ENERGY PRODUCTS AND RELATED PROCESS

The present invention refers to a system for controlling and managing a chain of a plurality of energy products.

The present invention further refers to a computerizing process of the chain of a plurality of energy products.

As known, in many production-logistic processes, it is necessary to make the production process for handling goods efficient, not only for economic reasons, since a scarcely efficient process increases transport costs for the goods, but also from the environmental point of view, where it is important to efficiently transport in a capillary way the products, in order to reduce the environmental impact of energy expenses linked to transports of goods. Such sector has an inefficient management, since, between the manufacturer of mineral oils and the end customer, there are a multitude of intermediaries, who create a chaotic and scarcely efficient and effective mechanism when handling the products.

Moreover, it is known that the tracking of products has become a mandatory need, especially in the field of energy products, such as for example lubricating oils, with which legal constraints are associated, for safeguarding the environment and optimizing the supply, storage and sales chain of the products. It is further necessary, in the logistic-managing field, to have available a constant control on the types of products, such as for example when managing lubricating substances, where national directives must be complied with, so that, regarding stocks and handling of energy products with a weight greater than 500 kg, a suitable Customs license must be obtained, with reference to the warehouse.

Since there is an inefficient distribution chain in the field of lubricating oils, this is a disadvantage for the end user, who, not having a capillary sales service, has no possibility to purchase, in short times, the desired lubricants in his own territory area at a price corresponding to its actual value.

Therefore, there is a strong need in the field of lubricants and of energy products to perform technical improvements to their logistic system through a computerized production process where there is a digitized monitoring of all phases of distribution, mixing and final sales to end users, who are simple purchasers, resellers or wholesalers. In addition to the fact that it is necessary to provide innovative solutions for the possible recycling not only of exhaust oils, but also of used containers.

Object of the present invention is providing a system for managing and controlling the chain of energy products designed to computerize the plurality of steps of the chain.

Another object of the present invention is providing a computerizing process of the chain of energy products.

The above and other objects and advantages of the invention, as will appear from the following description, are obtained with a system for controlling and managing the chain of energy products and its related process as claimed in their respective independent claims. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention, as claimed in the enclosed claims.

The present invention will be better described by some preferred embodiments thereof, provided as a non-limiting example, with reference to the enclosed drawings, in which FIG. 1 shows a block diagram of an embodiment of the system according to the present invention.

With reference to FIG. 1, a system 100, according to the present invention, for controlling and managing a chain of a plurality of energy products, such as, for example, lubricating oils, exhaust oils or other similar ones, is designed to computerize and digitalize a plurality of steps of the chain, such as, for example, the steps of transporting, stocking, mixing and recycling the energy products, etc., including a plurality of physical and electronic flows related to the plurality of entering and exiting energy products, technologies, resources which operate for creating, transforming, distributing, marketing and supplying the energy products, through a computerizing process.

Advantageously, the system 100 according to the present invention comprises:

at least one database 1 centralized and customized depending on a plurality of implementation needs, required by a user, preferably through Data-Model, or ER-Model techniques, and designed to collect a plurality of data related to the plurality of steps of the chain enabling a plurality of industrial applications, such as, for example, automating the procedures, replicating the procedures, exchanging data, tracking information, guaranteeing safety and protection of the plurality of data, and quick execution times;

a managing module 10 designed to perform an analysis of a plurality of functional information implementing a plurality of procedures, such as, for example, the efficient reordering of the plurality of energy products, a process of predictive logistics, predictive maintenance, traceability of the plurality of energy products, etc., aimed to computerizing the chain of the plurality of energy products;

a plurality of operating areas, designed to be interfaced through a plurality of communication interfaces, such as, for example, standardized and procedurized communication means, with the database 1 and with the managing module 10, and to process such plurality of functional information from the plurality of data collected from the database 1 and supply them to the managing module 10; and an operating system, such as Android, BlackBerry OS, iOS, Windows Phone or other similar one, designed to control the operation of the database 1 and of the managing module 10.

Advantageously, the managing module 10 is equipped with:

a plurality of event managers, executed in reply to a plurality of external events, such as for example, stocks in warehouses of energy products, designed to act according to models, procedures, etc. deduced from an analysis of the plurality of data stored in the database 1; and advantageously designed to trigger, through the use of a queue of events, a further cascade of events (trigger software);

a module of at least one operating system, such as, for example a dispatcher, or other similar one, which transfers the control of the central unit to the processes chosen by at least one process manager, such as for example a scheduler or other similar one; and the process manager of the operating system, designed to implement a scheduling algorithm, which, given a set of access requests to a resource, establishes a time ordering for executing a plurality of requests, giving priority to those which comply with certain time parameters, related to analysis timings deemed crucial for performing a process, optimizing the access to such resource and thereby allowing to perform such process.

As shown in FIG. 1, as a non-limiting example, the plurality of operating areas are mainly composed of:

at least one operating interfaces area 2, designed to manage a plurality of graphic interfaces 2a and three or more operating modules:

cash desk 2b, interfaced with the database 1 through a data-adapter interface able to record a plurality of transactions, to consult and verify the stocks of the plurality of energy products physically arranged in a warehouse and to issue the necessary tax documentation, such as, for example, receipts, cash desk closures, etc., even between different interfaces, guaranteeing their operability;

e-commerce 2c, equipped with three web-oriented and mobile-ready interfaces, designed to allow working with them also from portable computers, cellular phones, etc., such e-commerce module 2c being equipped with a Business-to-Customer, B2C, area designed to be interfaced with the consumer, for the retail sale of the plurality of energy products through telematics. In particular, the plurality of requests performed by the consumer through the three interfaces of the e-commerce module, after approval of the administrator of such B2C area, will be directly sent to the operating logistic area 3 for the shipment of the plurality of energy products, and all accounting documents stored and managed by the operating accounting area 4 will further be produced; with a Business-to-Business, B2B, area designed to be interfaced with a consumer, and/or wholesaler, and/or supplier, allowing, through the operating logistic area 3, to supply a warehouse, on third party account, with products with wholesaler amounts; and with a Business-to-Retail, B2R, area designed to manage a plurality of operations related to consumers with franchising contract, allowing the consumer to request the supply of the plurality of energy products being missing by such warehouse, to consult the current status of the plurality of energy products, and to perform a plurality of logistics operations by such warehouse, such as, for example an unsold return or a request for advertising material, etc., and to perform logistic reports;

customer portal 2d, such as, for example, a personal area accessible through a web-oriented and mobile-ready interface guaranteeing its use to the consumer from any device, designed to display a plurality of competence areas, such as for example a documents area; an invoicing area; a contracts area to request an appointment with a consultant or with the administrator of the system 100, and/or advertising material and/or a packaging customized for collecting exhaust oils, and/or a product catalogue, such competence areas being activated for a consumer depending on the contractual situation established by the consumer;

at least one operating logistic area 3, designed to manage a plurality of transactions and to handle the plurality of energy products through at least one warehouse 3a. Each product is recorded through an operating customer managing area 5, and is inserted in at least one warehouse. Such operating logistic area 3 comprises three or more warehouses:

a first warehouse 3b, such as, for example, a store, or other similar one designed to contain the plurality of energy products available to be sold on-line or physically through an interaction of the consumer with the operating interfaces area 2; preferably, the first warehouse 3b is equipped with a warning element designed to signal the amount of products which can be contained in the warehouse, such amount being adapted to be customized and modified depending on standards in force in the country of use of the system 100;

a main warehouse 3c, designed to contain as deposit, the plurality of energy products, preferably differentiating the plurality of energy products depending on their origin, such as, for example, European or Italian origin, or other similar one, guaranteeing the chance of complying with laws in force in the country of use of the system 100. Advantageously, the main warehouse 3c is equipped with a first virtual area for a plurality of energy products purchased and transported on third party account, and with a second virtual production area for a plurality of re-evaluation products of the exhaust oils; and a warehouse for exhaust oils 3d, designed to collect the plurality of exhaust oils, coming from a plurality of collection points, tracking the amount of exhaust oils still to be regenerated;

at least one operating accounting area 4 designed to manage the accounting implementing rules and procedures to comply with accounting and legal constraints. Such operating accounting area 4 is able to group a plurality of economic transactions physically occurred in the first warehouse 3a, and virtually through the e-commerce module 2c producing accounting reports specifically designed to comply with tax rules of the country of use of the system 100, using the required measure unit, such as, for example, pieces or liters, or kilograms, complying with the specific requests for tax needs;

at least one operating customer managing area 5 managed by the software planning module 5a, such as, for example, the Customer Relation Management, CRM, or other similar one, designed to manage and guarantee the functionality of at least four areas, through a plurality of web-oriented and possibly remote interfaces, enabling a remote managing mode of the operating customer managing area 5:

purchasing area 5b, designed to manage the plurality of requests of the suppliers, compare them and proceed with a plurality of supplying activities of the plurality of energy products, managing possible operating constrains set by the administrator, for performing the plurality of supplying activities;

foreign area 5c, designed to perform relationships with Customs and with the foreign suppliers, guaranteeing advantageous agreements, and to monitor the transit of the plurality of energy products in Europe; the foreign area 5c is equipped with an automatic telematics interface related to taxes about manufacture and sale of the plurality of energy products, able to send necessary information to responsible government departments;

logistics area 5d, designed to manage the plurality of supplying activities of the plurality of warehouses, evaluating possible stocks, monitoring the plurality of physical and electronic flows related to the plurality of energy products among a plurality of warehouses, and surveying and guaranteeing that the movement of each product and its related packaging are suitably accompanied by a digital transaction. Such logistics area 5d, through a plurality of software optimization programs, manages the logistics of the exhaust oils and of the related packages, guaranteeing their safe, ecologic and economically advantageous movements; and a commercial area 5e.

Moreover, the operating customer managing area 5 is equipped with at least one documents managing module 5f, designed to collect a plurality of documents generated by the system 100: logistic document, such as, for example, goods loading/unloading documents, stock reports, purchase orders, etc.; accounting documents, such as, for example, F24 forms, excise reports, VIES, Customs documentation (DAA, DAS and XAB) etc.; administrative documents, such as, for example, consumer/company contracts, issued and/or received invoices, authorizations and licenses, company records, etc. Each document is available and usable by the administration and/or by the consumer. Such documents are the history of the operation of the consumer, and/or wholesaler, etc.

The invention further deals with a computerizing process, performed through the managing and controlling system 100, designed to computerize and digitalize the chain of energy products; such process comprises the steps of:

coordinating the physical and electronic flows related to the plurality of energy products and their related packages, in particular through the operating customer managing area 5, which are tracked through a univocal identification of each energy product, through a radio frequency (RFID) technology, or a bar code, or other similar one, designed to associate with every physical energy product, a computer product of such plurality of physical and electronic flows related to the plurality of energy products, allowing to track a plurality of physical and virtual displacements of the energy product between the three or more warehouses of the operating logistic area 3, connecting to the energy product the plurality of documents generated by the system 100 through the documents managing module 5f of the operating customers area 5, guaranteeing the integrity of the computer product and simultaneously ensuring that the plurality of operating areas are equipped with the necessary information to perform their activities autonomously; for example, a physical flow is represented by a goods entrance in a warehouse, inducing an increase of the stocks of such goods in the warehouse, activating, through the plurality of event managers of the managing module 10, a cascade of events (trigger software) which automatically allows: satisfying the requests waiting for the energy product by the consumer, producing a computerized notification and accounting flow of such requests; updating the availability of the various e-commerce depending on the end user, such as consumer, supplier, or wholesaler; producing the plurality of documents related to such physical flow; and updating the plurality of data in the database 1 to guarantee the traceability of the energy product;

analyzing periodically, and/or in real time, the stocks of the plurality of energy products in the plurality of warehouses, balancing the amount of the plurality of energy products, scheduling a plurality of requests of the plurality of energy products, forecasting their re-ordering time, sending an automatic and timed order to the suppliers, also depending on the market price monitored and located as more advantageous for the consumer, through the scheduling algorithm implemented by the process manager of the managing module 10, able to establish a time ordering for executing the plurality of requests, giving priority to those which comply with certain time parameters, related to analysis timings deemed crucial for performing the process, optimizing the access to such resource and thereby allowing to perform such process;

automatizing the plurality of activities of the operating logistic area 3, through the transmission of a plurality of orders to the service personnel, such as, for example, packaging, shipment, disassembling, movement of the plurality of energy products;

monitoring the production process of the plurality of energy products through a plurality of sensors, arranged on the plurality of components such as, for example, pump, tank, solenoid valves, heaters, etc. of the apparatuses used for producing such plurality of energy products, allowing through the managing module 10 to check and monitor a production process of such plurality of energy products and to forecast its possible failure points, zeroing their maintenance costs and balancing the production processes, exploiting the hardware redundancy and alternating the plurality of components till the failure is repaired, or postponing the production processes till the failure is repaired; and analyzing and producing, through the operating accounting area 4, a plurality of market statistics necessary to meet the consumer needs, simultaneously optimizing managing costs and standards of such plurality of energy products.

Advantageously, the system 100 is also designed to produce and dispense the plurality of energy products with packages and/or formats customized by the consumer through the first warehouse 3b, the operating logistic area 3, enabling a reduction of environmental impacts and providing a more economic and logistic satisfaction for the consumer.

Finally, the operating interfaces area 2 allows producing and making usable for the consumer a product catalogue, customized depending on the consumer, the economic agreements performed between consumer and supplier, the nation or country of use of the system 100; allowing the use of such system 100 in a plurality of nations and allowing it to manage the taxation policies, maximizing their sales.

The invention has the following advantages:

providing a logistic warehouse servicing the companies which are lacking structures and authorizations in compliance with standards in force, at European and national level;

allowing to stock the products in advantageous places at logistic level, such activities allowing to reduce the transport time for the goods and to reduce gas emissions related to goods transports;

reducing illegal stockings of lubricating oils, by monitoring not only the exhaust oils, but also their related packages through systems for tracking them;

Digitalizing all steps of the chain, namely transport, stocking, mixing and recycling of used goods, including their packages;

reducing production, packaging and stocking operations, reducing their environmental impact in terms of risk of dispersing the products, and reduced production emissions;

automatizing the procedures, reducing human errors, centralizing all information, and tracking all transport and sales steps, obtaining a chronology of handlings for future replications or other industrial applications; and informing the consumer in real time about possible stocks of goods in the warehouse, and simultaneously taking care of the possible shipment and/or production of the products which are about to run out.

The invention claimed is:

1. A system for controlling and managing at least one chain of a plurality of energy products designed to computerize and digitalize a plurality of steps of said chain, the system comprising:

a managing and controlling system configured to track the plurality of energy products within at least one warehouse using a different univocal identification for each of the plurality of energy products;

at least one database, centralized and customized depending on a plurality of implementation needs, required by at least one user, and designed to collect a plurality of data related to said plurality of steps of said chain enabling a plurality of industrial applications;

at least one managing module, designed to perform an analysis of a plurality of functional information implementing a plurality of procedures to associate with each of the plurality of energy products a different virtual energy product representative of the corresponding physical energy product based on the corresponding univocal identification, the virtual energy product being stored in at least one virtual warehouse representative of the at least one warehouse, the at least one managing module being equipped with a module of at least one operating system, designed to transfer the control from a central unit to a plurality of processes chosen by at least one process manager; and the process manager of the at least one operating system;

a plurality of operating areas, designed to be interfaced, through a plurality of communication interfaces, with said database and with said managing module, and to process said plurality of functional information from said plurality of data collected from said database and supply them to said managing module, wherein said plurality of operating areas are mainly composed of:

an operating interfaces area, designed to manage a plurality of graphic interfaces and three or more operating modules, and allow producing and making usable for at least one consumer a product catalogue, customized depending on said consumer, economic agreements performed between said consumer and at least one supplier, and a nation or country of use of said system;

at least one operating logistic area, designed to manage said plurality of transactions and of handlings of said plurality of energy products through the at least one warehouse, each of said plurality of energy products being recorded through an operating customer managing area, and being inserted in the at least one warehouse, said operating logistic area comprising three or more warehouses;

at least one operating accounting area, designed to manage the accounting implementing rules and procedures to comply with accounting and legal constraints, said operating accounting area being able to group a plurality of economic transactions physically occurred in at least one first warehouse and virtually through at least one e-commerce module producing accounting reports specifically designed to comply with tax rules of the country of use of said system, using a required measure unit, complying with specific tax needs requests; and at least one operating customer managing area managed by at least one software planning module, designed to manage and guarantee a functionality of at least four areas, through a plurality of web-oriented interfaces, enabling a remote managing mode of said operating customer managing area;

the at least one operating system, designed to control an operation of said database and of said managing module;

a plurality of sensors arranged on a plurality of components of apparatuses used for producing the plurality of energy products, allowing through the at least one managing module to check and monitor a production process of the plurality of energy products and forecast a failure point, exploiting a hardware redundancy and alternating the plurality of components till said failure is repaired, and postponing the production processes till the failure is repaired; and a plurality of event managers executed in reply to a plurality of external events, designed to act according to models, or procedures, deduced from said analysis of said plurality of data stored in said database, and advantageously designed to trigger, through the use of a queue of events, a further cascade of events, namely a trigger software.

2. The system according to claim 1, wherein said managing module comprises:

a plurality of event managers, executed in reply to a plurality of external events, designed to act according to models, or procedures, deduced from said analysis of said plurality of data stored in said database, and advantageously designed to trigger, through the use of a queue of events, a further cascade of events, namely a trigger software;

a module of said operating system, designed to transfer the control from a central unit to a plurality of processes chosen by at least one process manager; and said process manager of said operating system, designed to implement at least one scheduling algorithm which, given a set of access requests to a resource, establishes a time ordering for executing a plurality of requests, giving priority to those which comply with certain time parameters, related to analysis timings deemed crucial for performing a process, optimizing an access to such resource and thereby allowing to perform said process.

3. The system according to claim 1, wherein said operating interfaces area includes said three or more operating modules:

a cash desk, interfaced with said database through a data-adapter interface able to record a plurality of transactions, to consult and verify the stocks of said plurality of energy products physically arranged in the at least one warehouse and to issue the tax documentation guaranteeing their operability;

said e-commerce, equipped with three web-oriented and mobile-ready interfaces, designed to allow their use from any device, said e-commerce module being equipped with a Business-to-Customer, B2C, area designed to be interfaced with said consumer, for the retail sale of said plurality of energy products electronically, a plurality of requests performed by said consumer through said three interfaces of said e-commerce module, after approval of the administrator of said area B2C, being directly sent to said operating logistic area for the shipment of said plurality of energy products, and all accounting documents stored and managed by said operating accounting area being further produced; with a Business-to-Business, B2B, area designed to be interfaced with said consumer, and/or wholesaler, and/or supplier, allowing, through said operating logistic area, to supply said at least one warehouse on third party account, with products with wholesaler amounts; and with a Business-to-Retail, B2R, area designed to manage a plurality of operations related to a consumer with franchising contract, allowing said consumer to request a supply of said plurality of energy products being missing by said warehouse, to consult the current status of said plurality of energy products, and to perform the logistics operations by said warehouse, and to perform logistic reports; and a customer portal, designed as a personal area accessible through a web-oriented and mobile-ready interface, guaranteeing its use for said consumer from any device, and designed to display a plurality of competence areas, activated for said consumer depending on said contractual situation established by said consumer.

4. The system according to claim 1, wherein said operating logistic area comprises said three or more warehouses:

said first warehouse, designed to contain said plurality of energy products available to be sold on-line or physically through an interaction of said consumer with said operating interfaces area;

a main warehouse, designed to contain as deposit said plurality of energy products, guaranteeing the chance of complying with laws in force in the country of use of said system, said main warehouse being equipped with a first virtual area for said plurality of energy products purchased and transported on third party account, and a second virtual production area for a plurality of revaluation products of the exhaust oils; and a warehouse for exhaust oils, designed to collect said plurality of exhaust oils, coming from a plurality of collection points, tracking an amount of exhaust oils still to be regenerated.

5. The system according to claim 1, wherein said operating customer managing area includes four areas:

purchasing area, designed to manage said plurality of suppliers' requests, compare them and proceed with a plurality of supplying activities of said plurality of energy products;

foreign area, designed to perform relationships with Customs and with the foreign suppliers, guaranteeing advantageous agreements, and to monitor the transit of said plurality of energy products in Europe, and which is equipped with an automatic telematics interface related to taxes about manufacture and sale of said plurality of energy products, sending necessary information to responsible government departments;

logistics area, designed to manage said plurality of supplying activities of a plurality of warehouses, evaluating possible stocks, monitoring a plurality of physical and electronic flows related to said plurality of energy products between said plurality of warehouses and surveying and guaranteeing that the movement of each of said plurality of energy products and their related packaging are accompanied by a digital transaction, said logistics area, through a plurality of software optimization programs, managing the logistics of exhaust oils and of their related packaging; and a commercial area.

6. The system according to claim 5, wherein said operating customer managing area includes at least one documents managing module designed to collect a plurality of documents generated by the system, each of said plurality of documents being available and usable by said administration and/or by said consumer.

7. The system according to claim 1, wherein the system is designed to produce and dispense said plurality of energy products with packages and/or formats customized by said consumer through said first warehouse, of said operating logistic area.

8. A computerizing process, performed through the managing and controlling system according to claim 1, designed to computerize and digitalize a chain of energy products, said process comprising:

coordinating said plurality of physical and electronic flows related to said plurality of energy products and related packages, in particular through said operating customer managing area, tracked through a univocal identification of each of said plurality of energy products, designed to associate with each physical product of said plurality of energy products, at least one computer product of said plurality of physical and electronic flows related to said plurality of energy products, allowing a tracking of a plurality of physical and virtual displacements of the energy product between the three or more warehouses of the operating logistic area, connecting to the energy product said plurality of documents generated by said system through said documents managing module of said operating customer area, guaranteeing an integrity of said computer product and simultaneously ensuring that said plurality of operating areas are equipped with a plurality of necessary information for performing their activities autonomously;

analyzing periodically, and/or in real time, said stocks of said plurality of energy products in said plurality of warehouses, balancing the amount of said plurality of energy products, scheduling a plurality of requests of said plurality of energy products, forecasting their re-ordering time and sending at least one automatic and timed order to suppliers, also depending on their market price monitored and located as more advantageous for said consumer, through said scheduling algorithm implemented by said process manager of said managing module able to establish a time ordering for executing said plurality of requests, giving priority to those which comply with certain time parameters, related to analysis timings deemed crucial for performing said process, optimizing an access to said resource and thereby allowing to perform said process;

automatizing said plurality of activities of said operating logistic area, through a transmission of a plurality of orders to service personnel;

monitoring said production process of said plurality of energy products through a plurality of sensors, such as, for example, arranged on a plurality of components of apparatuses used for producing said plurality of energy products, allowing through said managing module to check and monitor a production process of said plurality of energy products and forecast a failure point, exploiting a hardware redundancy and alternating said plurality of components till said failure is repaired, or postponing said production processes till said failure is repaired; and analyzing and producing, through said operating accounting area, a plurality of market statistics necessary to meet needs of said consumer, simultaneously optimizing managing and standard costs of said plurality of energy products.

9. The system according to claim 2, wherein the system is designed to produce and dispense said plurality of energy products with packages and/or formats customized by said consumer through said first warehouse, of said operating logistic area.

10. The system according to claim 1, wherein the system is designed to produce and dispense said plurality of energy products with packages and/or formats customized by said consumer through said first warehouse, of said operating logistic area.

11. The system according to claim 3, wherein the system is designed to produce and dispense said plurality of energy products with packages and/or formats customized by said consumer through said first warehouse, of said operating logistic area.

12. The system according to claim 4, wherein the system is designed to produce and dispense said plurality of energy products with packages and/or formats customized by said consumer through said first warehouse, of said operating logistic area.

13. The system according to claim 5, wherein the system is designed to produce and dispense said plurality of energy products with packages and/or formats customized by said consumer through said first warehouse, of said operating logistic area.

14. The system according to claim 6, wherein the system is designed to produce and dispense said plurality of energy products with packages and/or formats customized by said consumer through said first warehouse, of said operating logistic area.

* * * * *